Aug. 1, 1961   W. A. SCHAICH   2,994,103
METHOD AND APPARATUS FOR TRIMMING BLOWN PLASTIC ARTICLES
Filed May 26, 1960   7 Sheets-Sheet 1

INVENTOR.
WILBUR A. SCHAICH
BY J. R. HOGE &
W. A. SCHAICH
ATTORNEYS

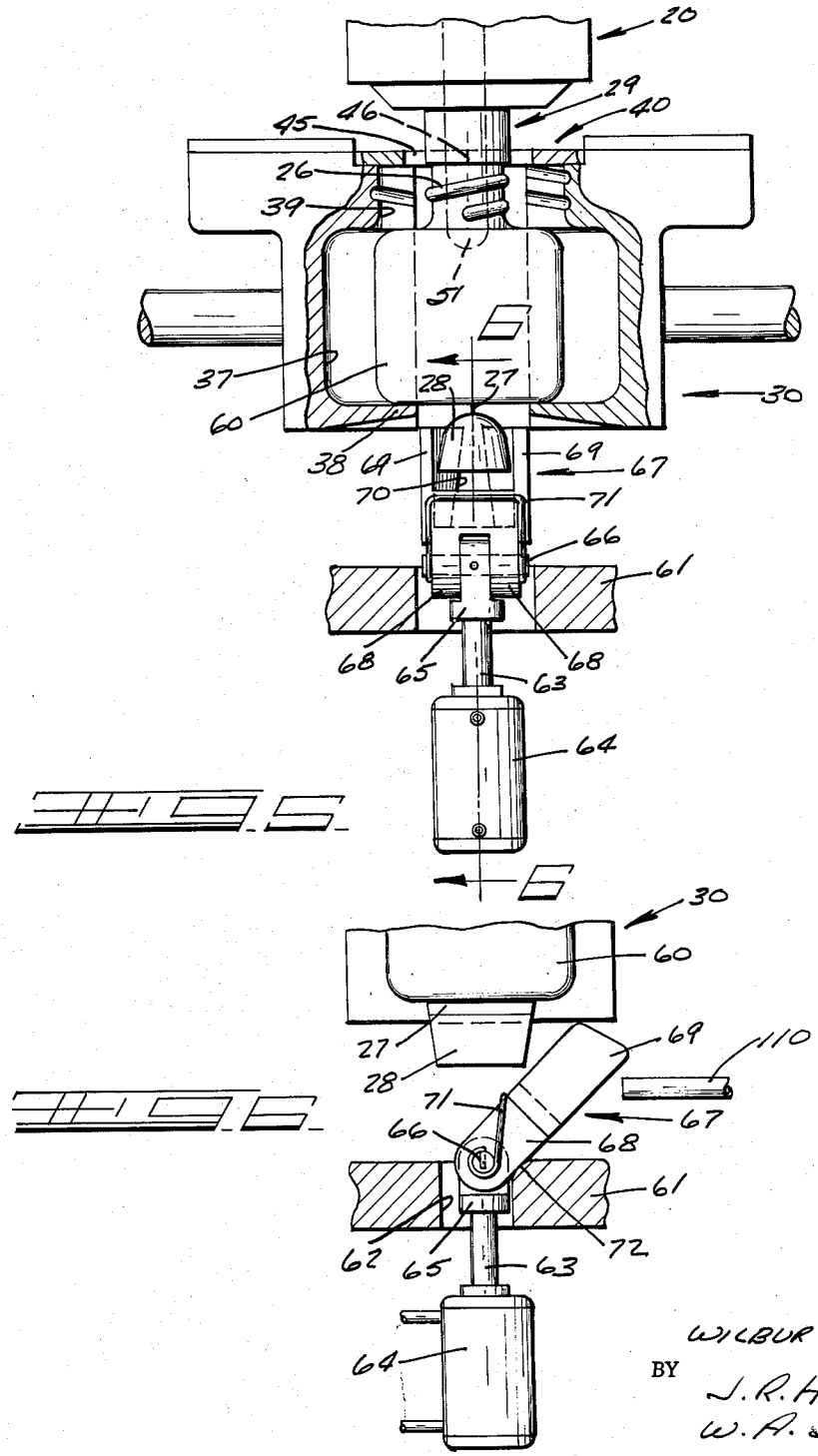

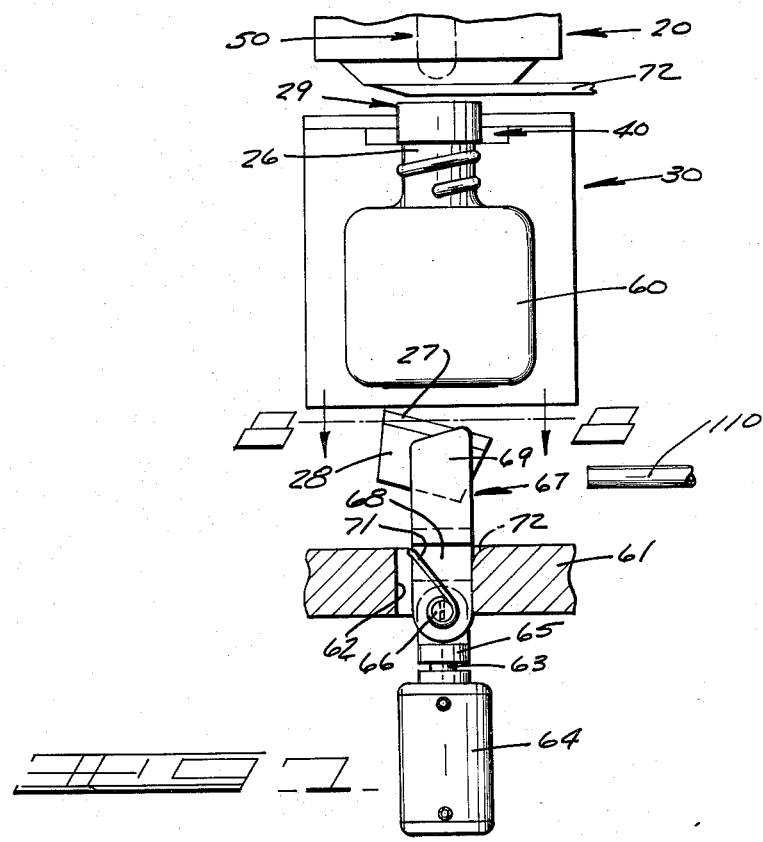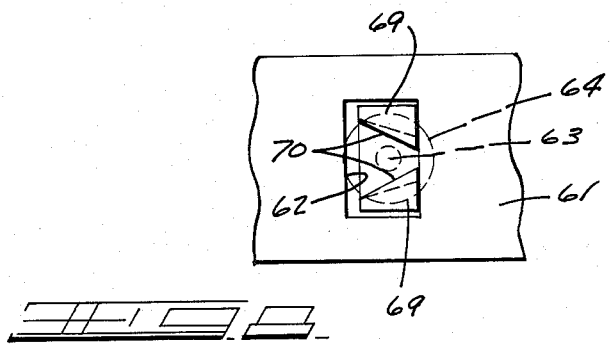

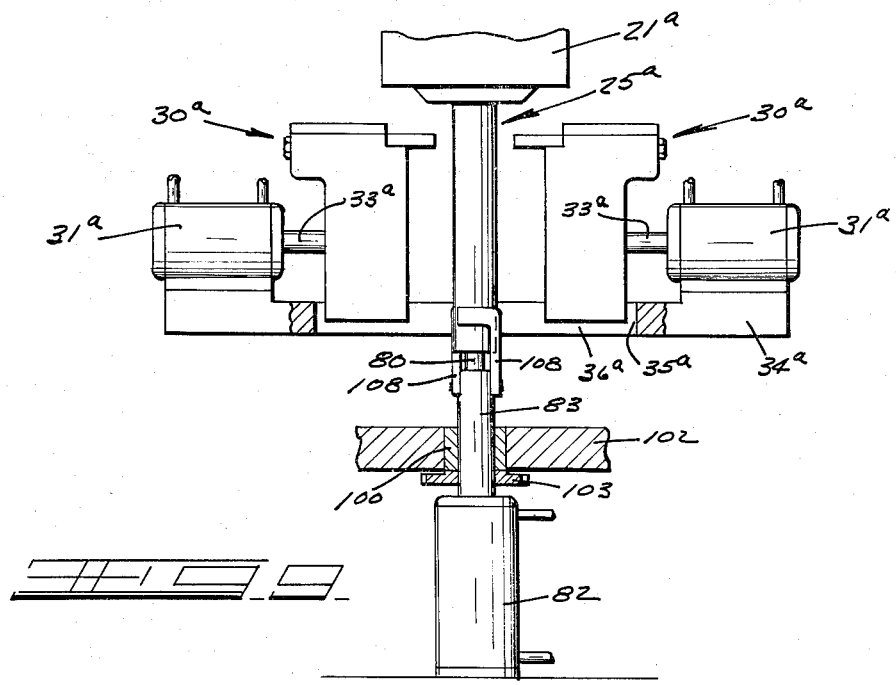
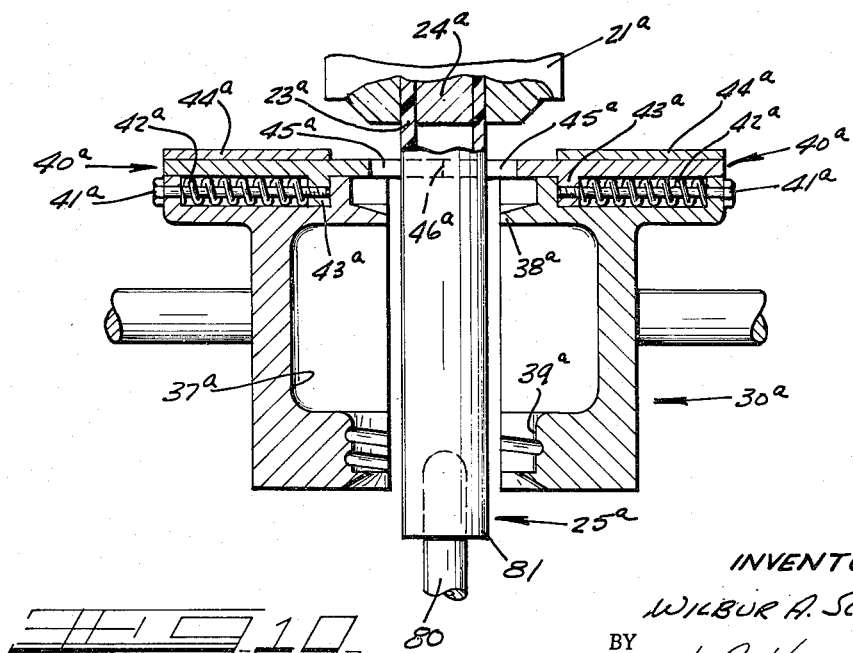

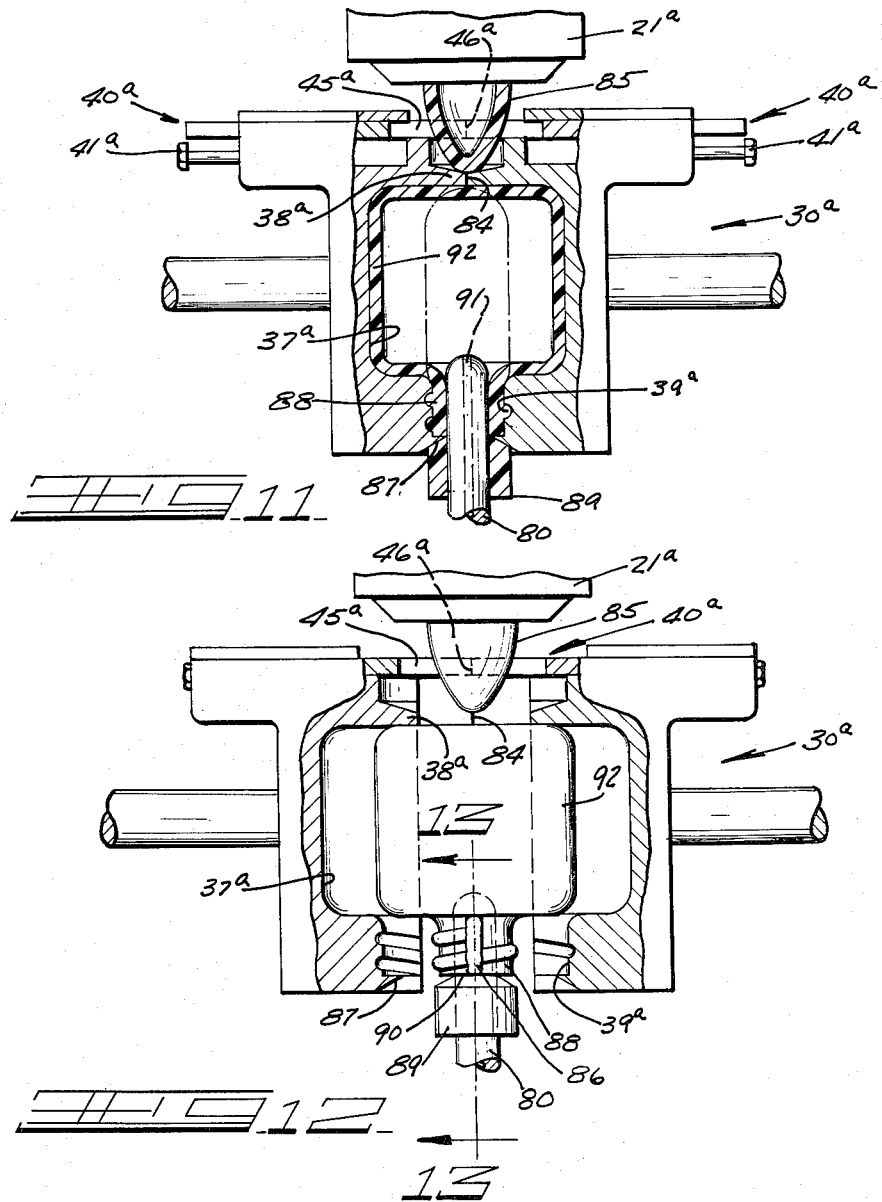

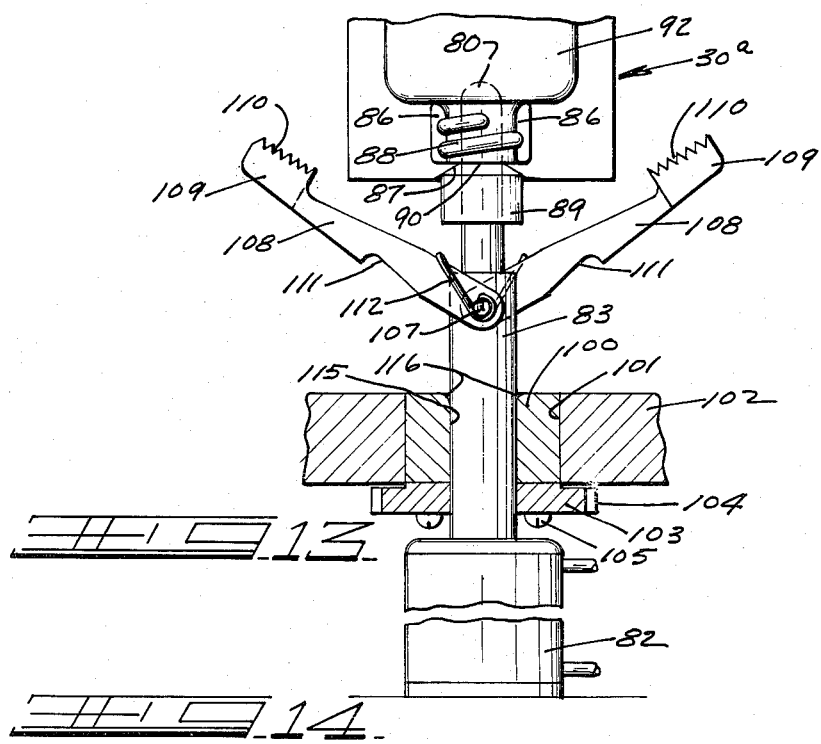
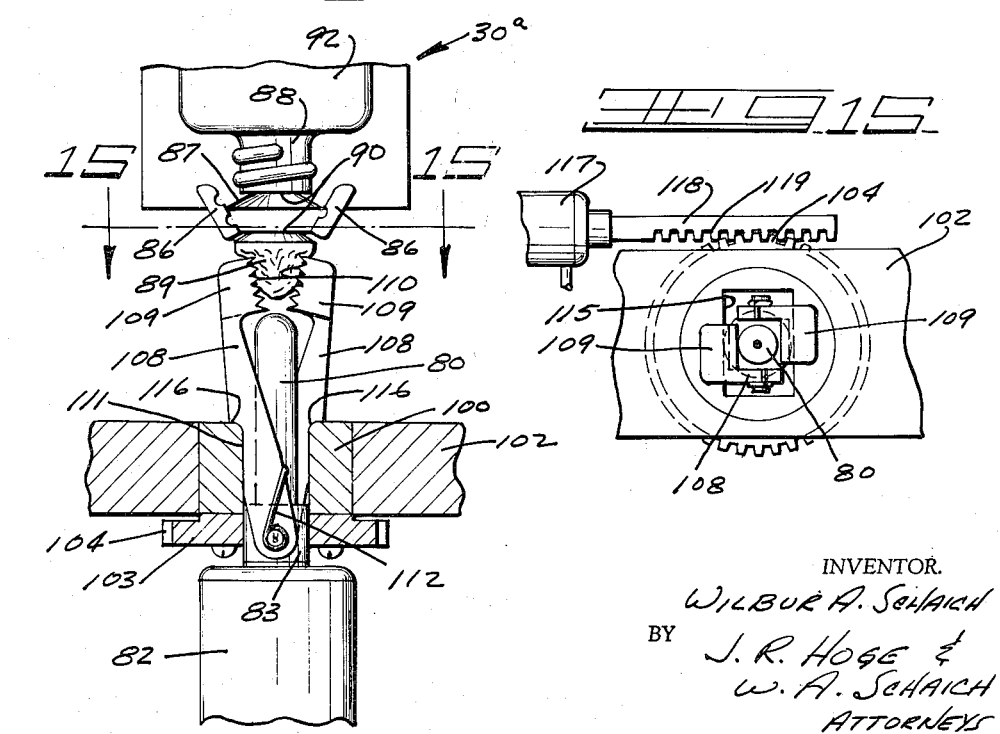

United States Patent Office 2,994,103
Patented Aug. 1, 1961

2,994,103
METHOD AND APPARATUS FOR TRIMMING BLOWN PLASTIC ARTICLES
Wilbur A. Schaich, Maumee, Ohio, assignor to Owens-Illinois Glass Company, a corporation of Ohio
Filed May 26, 1960, Ser. No. 31,861
18 Claims. (Cl. 18—5)

The present invention relates to an improved method of and apparatus for making a plastic article and more particularly to a method and apparatus for blowing a plastic article from a tube and severing a waste portion therefrom.

In the manufacture of plastic articles, it has been proposed that a heat softened and plasticized tube or tubular blank, capable of being expanded by the introduction of air thereinto, be enclosed within a pair of blow molds and expanded into contact with the mold cavity walls. In the development of the method and apparatus for so making plastic articles, substantial difficulties have been encountered in the removal of "flash" or waste portions from the tube.

Since the tube is blown immediately after its extrusion as an open ended tubular length of material, the tube must be pinched shut by the blow molds to form a bag suitable for blowing. The pinching shut of the tube necessarily forms a waste portion projecting beyond the mold. This waste portion must be removed from the blown article. Additionally, in the manufacture of bottles and similar articles, the blowing is accomplished by a blow head or mandrel inserted into the tube and necessarily extending into the mold from an exterior source of blowing pressure. The closure of the mold on the tube generally pinches the tube at the mold closure surfaces and forms non-blown fins or projections where the pinching occurs. These waste portions must also be removed from the blown article.

The conventional manner of removing such waste portions involves the manual or mechanical severing of the waste portions from the article after the article has been removed from the mold. Such severing operations require separate severing apparatus and separate handling to and from the severing apparatus.

The present invention provides a new and extremely simple method of and apparatus for forming a finished article by the blowing of a tube in a blow mold, followed by at least partially opening the mold while supporting the article, engaging the waste portion formed during the blow molding operation, and relatively moving the waste portion and the article, thereby tearing the waste portion therefrom. Finally, the molds are completely opened and the article removed.

Only partially opening the molds during the removal of the waste portion provides several advantages, namely supporting of the article without requiring additional or extraneous supporting elements, and eliminating the necessity of supporting the article at a remote location. Further, opening the mold while still supporting the blown article exposes the pinched or reduced thickness portions joining the waste portion of the original tube to the article, such pinched portions being necessarily formed during the closure of the mold prior to blowing. Separation of the waste portion occurs at the pinched joining portion, thus providing a sharp line of separation at the most easily ruptured portion of the article waste portion.

The article, after blowing and during the waste portion removal, may be supported by the mold or by tube-engaging elements separate from the mold but actuated therewith. Preferably, separate tube-engaging elements are utilized so as to provide better support for the article upon partial opening of the molds.

It is, therefore, an important object of the present invention to provide an improved method of and apparatus for forming a plastic article from a tube upon which a pair of blow holes have been closed and for severing a waste portion formed upon mold closure.

Another important object is the provision of a method of making a plastic article by enclosing a tube in a pair of blow molds, blowing the tube to its final article configuration in the closed blow molds, at least partially opening the molds while supporting the article, and tearing a waste portion from the blown article.

It is a further object to provide an apparatus for making a plastic article and including a sectional blow mold closeable on a blowable tube, and means for at least partially opening the mold sections after the tube is blown to accommodate engagement of a waste portion with a removable element movable relative to the finished article and to the mold to tear the waste portion from the blown article.

Yet another object is the provision of an improved method of severing a waste portion from a blown plastic article by retaining the article in an at least partially closed blow mold after blowing, and then engaging and moving relative to the engaged article a waste portion substantially severed from the article-defining portion of the tube during initial closure of the blow mold.

Other objects of this invention will appear in the following description and appended claims, reference being had to the accompanying drawings forming a part of this specification wherein like reference characters designate corresponding parts in the several views.

In the drawings:

FIGURE 5 is a view similar to FIGURE 4 but also illustrating the waste portion removal apparatus;

FIGURE 6 is a sectional view taken along the plane 6—6 of FIGURE 5;

FIGURE 7 is a view similar to FIGURE 6 illustrating the operation of the waste removal device;

FIGURE 8 is a sectional view taken along the plane 8—8 of FIGURE 7;

FIGURE 9 is a view similar to FIGURE 1 illustrating a modified form of apparatus and method of the present invention;

FIGURE 10 is an enlarged fragmentary sectional view of the modification of FIGURE 9;

FIGURE 11 is a view similar to FIGURE 9 illustrating the mold closure and blowing steps of the process;

FIGURE 12 is a view similar to FIGURE 11 illustrating the partial opening of the molds;

FIGURE 13 is a fragmentary sectional view taken along the plane 13—13 of FIGURE 12;

FIGURE 14 is a view similar to FIGURE 13 and further illustrating the removal of the waste portion; and FIGURE 15 is a fragmentary sectional view taken along the plane 15—15 of FIGURE 14.

Figure 1:
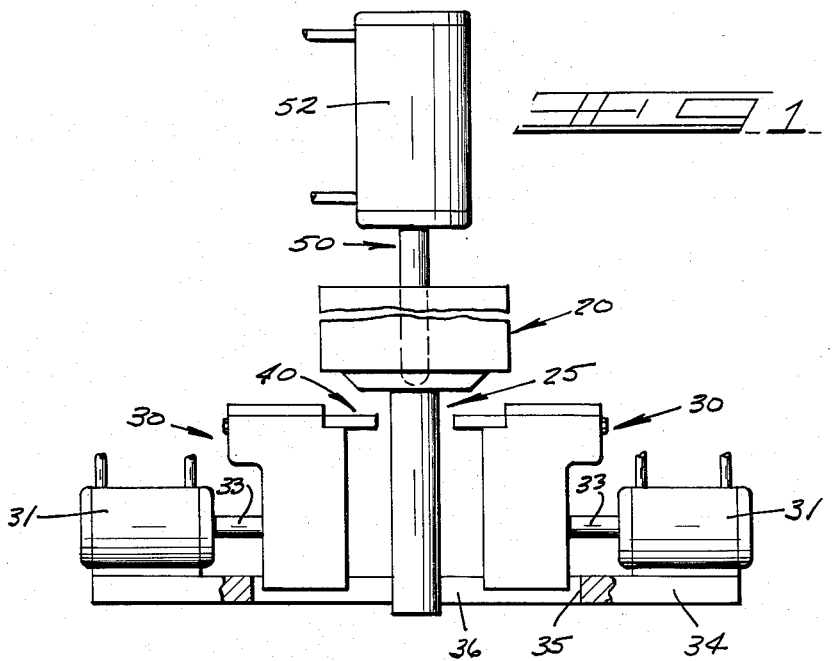
FIGURE 1 is a somewhat schematic elevational view of an apparatus of the present invention capable of carrying out the method of this invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in the drawings:

The embodiments of Figures 1 through 8

In FIGURE 1, reference numeral 20 refers to the outlet end of a plasticizer-extruder and includes an extruder block 21 having an interior cylindrical passage 22 therein communicating with a plasticizer-extruder of any desired, conventional type capable of supplying plasticized material, such as polyethylene or the like, thereto. Disposed in the passage 22 and terminating in closely spaced relation to the lower end thereof is a concentric sleeve 24, the passage 22 and the sleeve 24 disposed therein defining an annular outlet orifice 23 through which a plasticized tube 25 is expressed. The tube 25, being formed of the plasticized material, is capable of further shaping, as by blowing, and issues as a freely pendant length of tube hanging vertically from the orifice 23.

Disposed beneath the block 20 and in closely spaced relation thereto are a pair of cooperable blow mold sections 30. These blow mold sections 30 are actuatable into and out of abutment with one another by double-acting power means, such as fluid pressure actuated cylinders 31 having piston rods 33 connected to the blow mold sections 30. The cylinders 31 are supported upon a mold table 34, the table having an opening 35 in vertical registry with the orifice 23 and defined by side walls 36 adapted to guide the mold sections 30 for relative movement into and out of engagement with the extruded tube 25.

The blow molds 30 have interior mold cavities 37 which are segmental in configuration and which cooperate when the mold sections 30 are closed (as in FIGURES 3 and 4) to define the exterior contour of the article to be formed.

Figure 3:
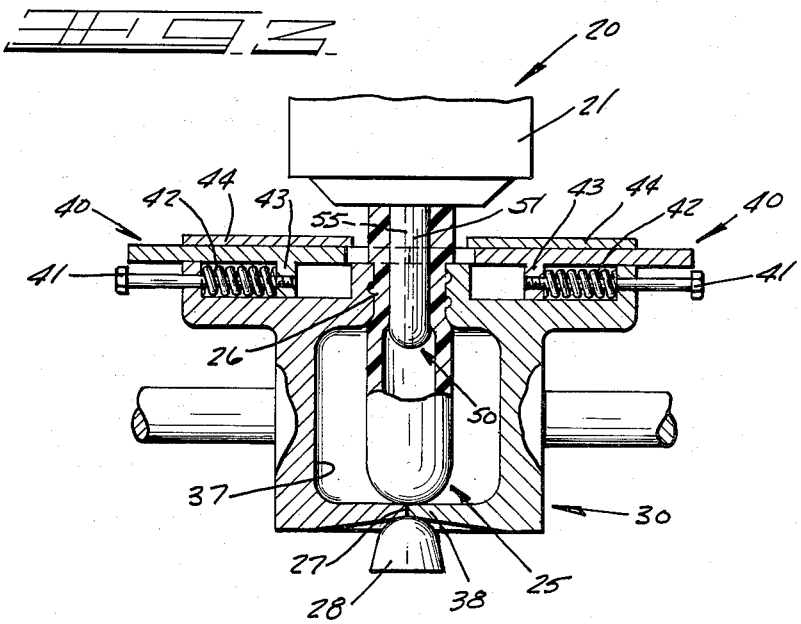
FIGURE 3 is a view similar to FIGURE 2 showing the molds in their fully closed positions.

The open ended tube 25 must be shut prior to blowing and the mold sections 30 are provided with cooperating lower pinching surfaces 38 engageable with the tube to close the same as illustrated in FIGURE 3. Since the article illustrated in the drawings as being formed by blowing is a container having a threaded neck, the neck portion is cooperably defined by upper recessed portions 39 of each mold section 30.

Carried by the upper end of each mold seciton is a slidable tube-engaging and holding element 40. Such elements 40 are supported for movement relative to the mold sections 30 on slide bolts 41 carried by the mold sections, respectively, the bolt shanks being surrounded by compression springs 42 bottomed against a surface 42 on the mold and against a depending flange 43 on the element 40. Upper retention plates 44 are carried by the mold halves 30 to cooperate with the remainder of the mold in guiding the elements 40 for lateral sliding movement.

Figure 2:
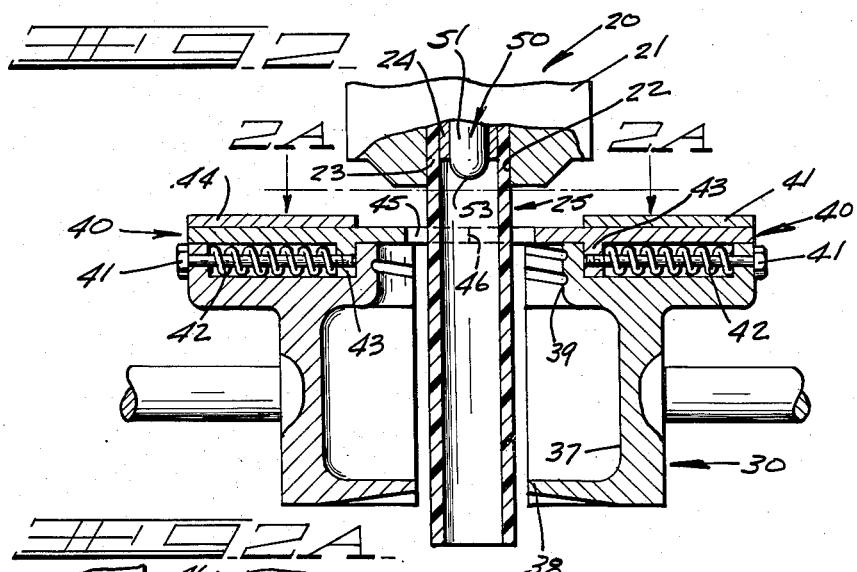
FIGURE 2 is an enlarged fragmentary sectional view illustrating the tube extrusion, blow mold and tube grasping portions of the apparatus.
Figure 2A:
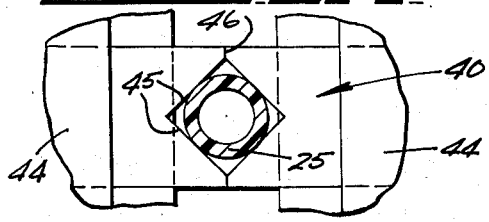
FIGURE 2a is a fragmentary sectional view taken along the plane 2a—2a of FIGURE 2.

As illustrated in FIGURE 2a, each of the elements 40 is provided with a V-shaped notch 45 at its leading edge, the elements having at the outer edges of their leading edges mutually abutting surfaces 46 lying normal to the direction of sliding movement of the elements.

During the extrusion of the desired length of tube 25, the mold actuating cylinders 31 are actuated so as to separate the mold sections 30, to accommodate the free extrusion of the tube between the blow mold sections 30. Once the desired length of tubing has been extruded, operation of the extruder is halted and the mold sections 30 are actuated to their partially closed positions of FIGURE 2 at which time the mutually engaging surfaces 46 of the elements 40 are in abutment (FIGURE 2a) and the tube 25 is positioned in the notches 45. Thus, the tube is supported against vertical displacement by the tube-engaging elements 40, even though the molds are only partially closed.

Following retention of the tube 25, the cylinders 31 are actuated to fully close the molds 30 as illustrated in FIGURE 3. Either immediately prior to closure of the mold sections 30 or immediately thereafter, a blow head 50 is inserted into the length of tubing 25. The blow head 50 comprises a vertically elongated tube 51, actuated for vertical movement by a fluid actuated cylinder 52 or the like, and having a rounded leading end 53 which projects into the tube a sufficient distance to accommodate the injection of air or other fluid blowing medium into the tube through an axial passage 55 in the blow head 50. Preferably, the blow head 50 is inserted in the tube length 25 prior to closure of the molds, so that upon mold closure the neck or finish-defining surface 39 will cooperate with the tubular blow head to press-form a portion 26 of the tube in a manner well known in the art. The exterior diameter of the blow head 50 is the same as the desired interior diameter of the portion 26 of the tube after such press-forming.

Also, it will be noted that the tube is pinched shut as at 27, by the mold section portions 38, thereby defining a waste portion 28 projecting beyond the mold sections 30 and joined to the blowable bag formed from the tube 25.

Since the tube-engaging elements 40 were previously in abutment (at their surfaces 46), full closure of the mold sections 30 does not move these elements relative to one another or relative to the tube 25. Rather, the mold sections close by movement radially inward of the tube 25 beneath the tube-engaging elements 40, such movement being accommodated by compression of the springs 42, as best shown in FIGURE 3.

Figure 4:
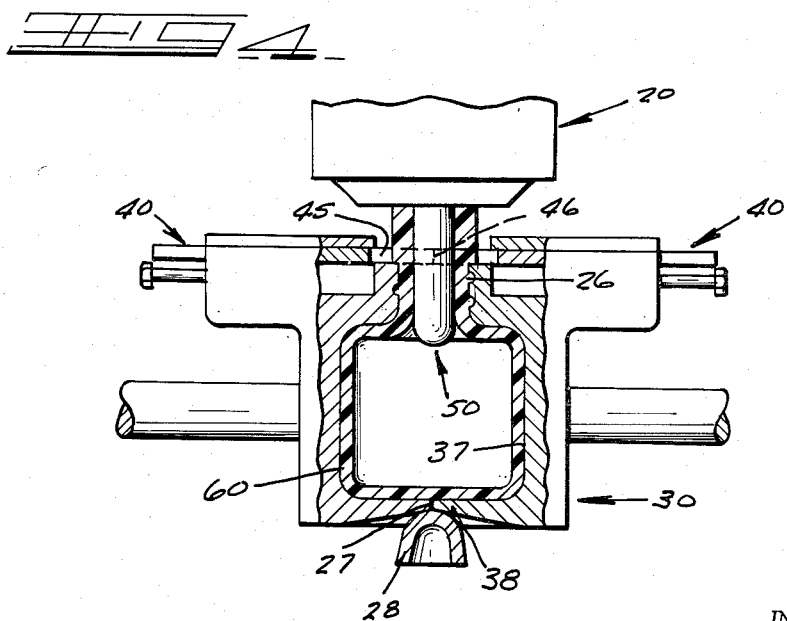
FIGURE 4 is a view similar to FIGURE 3 illustrating the blowing of the tube.

Next, air or any other suitable blowing medium is introduced through the blow passage 55 of the blow head 50 to inflate the tube to its final article configuration determined by the shape of the mold cavity 37. The inflation of the tube is illustrated in FIGURE 4, and it will be noted that such inflation does not effect the size of the waste portion 28 nor the size and contour of the press-formed finish portion 26 of the tube 25.

If the molds were now merely fully opened and the blown article removed, the article would have attached thereto the waste portion 28 which must then be conventionally removed in additional apparatus. However, in accordance with the present invention, the molds are only partially opened, as illustrated in FIGURE 5 of the drawings.

Such partial opening of the blow mold sections is preferably to an extent such that the leading edge surfaces 46 of the tube-engaging elements 40 remain in abutment, so as to support the article through the upper waste portion 29 lying intermediate the mold sections 30 and the orifice 23. Additionally, the blown portion of the tube 25 is supported by the partially opened mold, particularly by the lower portions 38 thereof. Of course, the extent of support of the article by the blow mold sections 30 is dependent upon the size and contour of the article and the extent of mold-opening movement. Thus, the article 60 is supported by the elements 40 and the mold sections 30 in combination, or by the elements 40 alone, against displacement.

Upon such partial opening of the mold sections 30, the pinched portion 27 of the tube is exposed intermediate the pinching edges 38 of the mold sections, and the waste portion 28 is also fully exposed. Positioned beneath the blow mold sections 30 is a supporting table or the like 61 having a vertical aperture 62 through which projects the actuating rod 63 of a fluid actuated cylinder 64. The actuating rod 63 carries an upstanding bracket 65 joined by a pivot pin 66 to a waste portion removal yoke 67. This yoke 67 comprises a pair of spaced depending legs 68 straddling the bracket 65 and a pair of upstanding side plates 69 cooperatively defining therebetween a V-shaped notch 70. Secured to the pin 66 and bearing against the legs 68 is a torsion spring 71 normally urging the yoke 67 in a clockwise direction. The upper right-hand edge of the aperture 62 is provided with an arcuate cam surface 72 against which the yoke 67 bears (FIGURE 6).

Upon downward movement of the piston 63 the bracket 65 and the pin 66 are moved vertically downward through the aperture 62. The spring 71 urges the yoke 67 against the cam surface 72 and this yoke-surface engagement is maintained during further retraction of the rod 63. The distance between the yoke side plates 69, i.e., the width of the slot 70 is less than the transverse dimension of the waste portion 28. Thus, during arcuate counterclockwise movement of the yoke 67 upon retraction of the rod 63, the yoke plates 69 contact the waste portion and moves the same both arcuately and vertically downwardly relative to the article 60 to tear the waste portion from the supported article 60 by rupturing the thin joining portion 27, as best seen by comparison of FIGURES 6 and 7. A jet of air from a nozzle 110 will then blow the waste portion 28 free from yoke plates 69.

Thus, it will be seen that the apparatus and method illustrated in FIGURES 1 through 8 makes possible the formation of a blow article and the severing of a waste portion therefrom without the complete removal of the article from the molding apparatus and, in fact, while the article is supported by the molding apparatus.

In FIGURE 7, the complete article is illustrated as being severed from the orifice block 20 by a severing knife 72 movable transversely across the orifice 23 after the blow head 50 has been retracted vertically. Alternatively, the tube 25 supported by the supporting elements 40 may be severed from the orifice 23 prior to insertion of the blow head 50.

In that embodiment of the machine shown in FIGURES 9 through 15, reference numerals identical with those utilized in FIGURES 1 through 8, but with the added suffix *a*, indicate identical parts of the apparatus.

Basically, the primary difference resides in the inversion of the blow mold sections 38*a* with the tube 25*a* being blown by a blow head 80 inserted into the open lower end 81 of the tube. Although the mold sections are inverted with the neck or finish defining portions 39*a* thereof at the lower extremity of the molds and the tube pinching portions 38*a* at the upper ends of the molds, the tube engaging members 40*a* occupy the same position relative to the tube and engage the tube 25*a* immediately exteriorly of the orifice 23*a*. The orifice 23*a* is defined by a solid orifice mandrel 24*a* and by the surrounding extruder head 21*a*.

As before, the tube is extruded downwardly from the orifice 23*a* to depend freely therefrom. The first operation includes actuation of the mold section cylinders 31*a* to bring the surfaces 46*a* of the tube engaging members 40*a* into abutment, thus engaging and supporting the tube by the surfaces 45*a*. Next, the blow head 80 is inserted into the free open lower end 81 of the tube 25*a* by actuation of a fluid cylinder 82, the piston rod 83 of which carries the blow head 80 for vertical movement therewith.

After insertion of the blow head 80, the mold sections 30*a* are fully closed, as best seen in FIGURE 11, to pinch the tube 25*a* shut, as at 84, at the upper extremity of the mold cavity 37*a* and beneath the tube-engaging elements 40*a*. The tube-engaging elements thus engage the upper waste portion 85 of the tube joined through the pinched portion 84 to the remainder of the tube 25*a*.

At the same time, closure of the mold sections 30*a* will press-form the neck or finish of the bottle between the cooperating mold surfaces 39*a* and the exterior surface of the mandrel 80. During this press forming operation a portion of the tube will be pinched between the closing faces of the mold sections and will form waste portions or fins 86, as best illustrated in FIGURES 13 and 14. Such fins are almost inherently formed because of the necessity for filling the recessed thread-defining portions of the mold surfaces 39*a* by the utilization of an initial tube having an exterior diameter greater than the root diameter of the threaded finish and also because of the necessity of having the tube wall thickness at least as great as the radial distance from exterior of the blow head 80 and the maximum thread diameter of the neck.

The mold sections 30*a* are also provided with sharp pinching surfaces 87 concentric with the mold cavity and projecting inwardly toward the blow head 80 and effective to substantially sever the threaded finish portion 88 of the article from a tube waste portion 89 formed by the lower end 81 of the tube after mold closure. Upon mold closure, the inwardly projecting edges 87 thus cooperate with the blow head 80 to substantially completely sever the finish 88 from the waste portion 89, and this waste portion 89 is joined to the finish portion 88 of the container through a thin frangible joining portion 90 (FIGURES 13 and 14).

Next, air is introduced through the usual blow head passage 91 to inflate the tube 25*a* to form the body 92 of the final article within the blow mold section cavities 37*a*.

Following blowing, the mold sections 30*a* are only partially opened, as illustrated in FIGURE 12, thereby exposing the finish portion 88 of the article and the frangible joining section 90 securing the waste portion 89 to the finish portion 88. The mold is opened only to such an extent that the waste portion 85 is still retained by the tube engaging members 40*a* and these members 40*a*, in combination with the only partially opened mold sections 30*a*, retain the article in fixed position.

Next, the cylinder 82 is retracted downwardly through a guide bushing 100 supported in an aperture 101 carried by a support plate 102. The bushing 100 is supported against vertical displacement in the opening 101, but is rotatable therein through a pinion 103 having external teeth 104 and secured to the bushing 100 for co-rotation, as by screws 105. Carried by the piston rod 83 is a transverse pivot pin 107 upon which are pivotally disposed a pair of arcuately movable arms 108. Each of these arms terminates at its outer or upper extremity in a laterally enlarged pad 109 having a serrated inner grasping surface 110. The arms 108 are provided with tapered cam recesses 111 intermediate their length, and the arms are urged to their spread positions of FIGURE 13 by suitable means, as by a torsion spring 112, having its ends anchored to the arms and its medial portion lapping the pivot pin 107.

Initial retraction of the cylinder 82 retracts the blow head 88 from the blown article and lowers the arms 108 into abutment with the bushing 100. As illustrated in FIGURES 13 through 15, the bushing has a rectangular opening 115 therein having upper curved cam surfaces 116 abuttable with the cam surfaces 111 on the arms 108, respectively, and this abutment cams the arms inwardly toward one another and toward engagement with the waste portion 89 of the article. When the piston rod 83 is fully retracted, as shown in FIG. 14, the cam surfaces 111 are firmly seated upon the cam surfaces 116 of the bushing 100 and the opposing serrated surfaces 110 of the arms 108 are in full grasping engagement with the waste portion 89. Due to the serrated edges 110, the arms 108 and the waste portion 89 engaged thereby are co-rotatable.

After engagement of the arms 108 with the waste portion 89, the bushing 100 may be rotated or oscillated by suitable means, as by a fluid pressure cylinder 117 having its piston rod 118 provided with rack teeth 119 engageable with the peripheral teeth 104 of the bushing pinion 103. The frictional engagement between the bushing 100 and the grasping arms 108 imparts rotary motion to the arms and through the serrated arm surfaces 110 to the waste portion 89.

Thus, the waste portion 89 is first engaged by the arm serrated surfaces 110 and a vertical severing force is imparted thereto. Following or concurrently with this action, the waste portion 89 is twisted by the rotation or oscillation of the arms 108 to sever the frangible joining portion 90 securing the waste portion 89 to the finish 88 of the article. Additionally, such rotation or oscillation will remove the axial fins 86 from the waste portion 88, since the plastic article is restrained from rotation by partially opened tube holding elements 45a and also the mold sections 30a.

Of course, many variations upon the specifically illustrated article forming process may be made. For example, the mold table 36 of FIGURE 1 or 36a of FIGURE 9 may be moved vertically to remove the tube from the extrusion nozzle for subsequent forming and/or blowing operations, thereby accommodating continuous extrusion of the tube 25 or 25a from the orifices 23 or 23a. Alternatively, a rotatable mold table 36 may be used having a plurality of sets of mold sections 30 and 30a. Still another variation might utilize a plurality of orifices supplied from a single plasticizer extruder and to which plasticized material is directed by a valving arrangement to sequentially extrude tubes from successive orifices for enclosure and blowing in separate molds. The time of severing the tube 25 or 25a from the orifice 23 or 23a, respectively, can be varied with such severence occurring prior to blowing or after blowing, since the tube will be supported by the engaging elements 40 or 40a prior to mold closure. However, all of these variations do not effect the prime concept of the present invention, namely the removal of the tube waste portion from the tube as supported by the partially open molds.

Having thus described my invention, I claim:

1. In an apparatus for making a plastic article, including an extruder for extruding a plasticized tube, a pair of tube-engaging elements supporting the tube by engaging a waste portion thereof, a pair of blow mold-halves, means actuating the mold-halves to a closed position to enclose a medial portion of the tube in a blow mold with the engaged waste portion and another waste portion projecting therefrom, a blow-head insertable into one of the waste portions to blow the tube to its final article configuration by air introduced through the blow head, the mold-actuating means opening the blow mold to expose the other waste portion while the tube and the blown article are supported by the elements engaging the waste portion, the improvements of grasping means for engaging the other waste portion, and actuating means for the grasping means to move the other waste portion relative to the supported article to separate the waste portion therefrom.

2. In a method of making a plastic article, including the steps of extruding a tube, enclosing and expanding a portion of the tube in a sectional blow mold, a waste portion of the tube projecting beyond the confines of the mold, the improvements comprising; at least partially opening the blow mold while supporting the article therein, engaging the waste portion only of the tube with an extraneous engaging element, and moving the engaging element and the waste portion therewith relative to the article to separate the waste portion from the article.

3. In a method of making a plastic container having a neck portion and a body portion by disposing a medial portion of a vertically supported expansible tube in a closeable multipart blow mold defining neck and body portions of the container, the mold when closed having both upper and lower portions engaging and pinching corresponding portions of the tube to partially sever the medial portion thereof from waste portions projecting vertically in both directions beyond the confines of the mold, and then blowing the mold-enclosed medial tube portion through one of the waste portions to its final article configuration, the improvements of removing the lower waste portion of the tube by the steps of initially only partially opening the blow mold to release the lower waste portion from the mold portions in engagement therewith while supporting the blown article against movement relative to the mold, grasping the lower waste portion exteriorly of the mold, concurrently downwardly and arcuately moving the waste portion relative to the blown article to separate the waste portions from the article, and opening the blow mold further to release the blown article therefrom.

4. In a method of making a plastic article, the steps of extruding a plasticized tube through an orifice, supporting the tube by engaging a first waste portion thereof adjacent the orifice, enclosing a medial portion of the tube in a separable blow mold with the first waste portion and a second waste portion projecting therefrom, the separable blow mold having sections pinching the tube to form a juncture of reduced thickness and strength between the second waste portion and the mold-enclosed medial tube portion, blowing the medial portion of the tube to its final article configuration by air introduced thereinto by a blow head inserted through the one waste portion, opening the blow mold to expose the juncture of the second waste portion and the blown medial tube portion while the first waste portion and the blown article are still supported, engaging the second waste portion only after exposure of the juncture, and moving the engaged second waste portion relative to the supported article and first waste portion to rupture the juncture between the second waste portion and the blown article.

5. In a method of making a plastic article by disposing a portion of an expansible tube in a closeable multipart blow mold, the mold when closed having portions engaging and pinching the tube to partially sever the enclosing portion thereof from a waste portion projecting beyond the confines of the mold, and then blowing the mold-enclosed tube portion to its final article configuration, the improvements of removing the waste portion of the tube by the steps of initially only partially opening the blow mold to release the waste portion from the mold portions in engagement therewith while supporting the blown article against movement relative to the mold, grasping the waste portion exteriorly of the mold, moving the waste portion relative to the blown article to separate the waste portion from the article, and opening the blow mold further and releasing the blown article to accommodate removal of the article therefrom.

6. In a method of making plastic articles, the steps of extruding a plasticized tube, closing a pair of blow mold sections on the tube to pinch shut a section of the tube intermediate the tube-enclosed portions of the tube and a waste portion of the tube projecting beyond the mold, blowing the tube-enclosed portion to its final article configuration, at least partially opening the mold sections to release the pinched tube section while still enclosing the blown article, grasping and moving the waste portion of the tube relative to the still-enclosed article to sever the waste portion therefrom at the pinched area thereof, and fully opening the molds and releasing the article for removal therefrom.

7. In a method of making a plastic article, including the steps of supporting a blowable plastic tube in a vertical position, closing a sectional blow mold on a portion of the tube, a waste portion of the tube projecting vertically in each direction beyond the confines of the mold, and blowing the tube through one of the waste portions to inflate the tube in the mold to its final article configuration, the improvements comprising; at least partially opening the blow mold while supporting the article therein by the upper waste portion, grasping the lower waste portion only of the tube with an extraneous engaging element, and arcuately moving the engaging element and the lower waste portion therewith relative to the supported article to separate the lower waste portion from the article, and then releasing the upper waste portion.

8. In a method of making a plastic article, the steps of extruding a plasticized tube, supporting the tube by engaging a waste portion thereof, enclosing a medial portion of the tube in a blow mold with the engaged waste portion and another waste portion projecting therefrom, blowing the tube to its final article configuration by air introduced through a blow head inserted in one of said waste portions, opening the blow mold to expose said other waste portion while still supporting the tube and the blown article by the engaged waste portion, and moving said other waste portion relative to the supported article to separate said other waste portion therefrom.

9. In an apparatus for making a plastic article by disposing a portion of an expansible tube in a closeable multipart blow mold, the mold when closed having portions engaging and pinching the tube to partially sever the enclosing portion thereof from a waste portion projecting beyond the confines of the mold, and then blowing the mold-enclosed tube portion to its final article configuration, the improvements of means removing the waste portion of the tube comprising; means for initially only partially opening the blow mold to release the waste portion from the mold portions in engagement therewith, means for supporting the blown article against movement relative to the mold, means for grasping the waste portion exteriorly of the mold, power means for moving the waste portion grasping means relative to the blown article to separate the waste portions from the article, and means for opening the blow mold further to release the blown article therefrom.

10. On a method of making a plastic article, the steps of extruding a plasticized tube through an orifice, supporting the tube by engaging a portion thereof adjacent the orifice, enclosing another portion of the tube in a blow mold with a tube waste portion projecting beyond the mold, blowing the mold-enclosed tube portion to its final article configuration, opening the blow mold to an extent sufficient to expose the juncture of the waste portion and the article while continuing to support the tube by the engaged portion thereof, removing the waste portion from the remainder of the tube, and releasing the article free of the waste portion.

11. In an apparatus for making a plastic article, including an extruder for extruding a tube, and a sectional blow mold structure in which a portion of the tube is supported for enclosure and expansion inside a blow mold cavity defined by cooperable blow mold halves, a waste portion of the tube projecting beyond the confines of the of the mold, the improvements comprising means for only partially separating the blow mold halves while still supporting the article by the mold structure, an engaging element engaging the waste portion only of the tube, and actuating means for moving the engaging element and the waste portion therewith relative to the article and to the mold structure to separate the waste portion from the article.

12. In an apparatus for making plastic articles, means for extruding a plasticized tube, a blow mold closeable on the tube to (1) pinch the tube shut, thereby segregating the tube-enclosed portions of the tube from a waste portion of the tube projecting beyond the mold, and (2) to support the tube, a blow-head insertable in the tube to blow the tube-enclosed portion to its final article configuration, means for opening the mold to an extent sufficient to release the pinched tube portion while still supporting the blown article, means for grasping and moving the waste portion of the tube relative to the blown and supported article to sever the waste portion therefrom at the pinched area thereof, and means for fully opening the molds and releasing the article for removal therefrom.

13. In a method of making a plastic article by engaging an upper portion of an expansible tube to support the same in a vertical position, enclosing the tube beneath the engaged portion in a closeable multipart blow mold, the mold when closed having portions engaging and pinching the lower portion of the tube to partially sever the enclosing portion thereof from a waste portion projecting beyond the confines of the mold, and then blowing the mold-enclosed tube portion to its final article configuration, the improvements of removing the waste portion of the tube by the steps of releasing the waste portion from the mold portions in engagement therewith, the blown article being supported against movement by the engaged upper tube portion, grasping the waste portion, tearing the waste portion from the article, and releasing the engaged upper tube portion.

14. In an apparatus for making plastic articles, an extruder for extruding a plasticized tube, a pair of blow mold sections closeable on the tube and having cooperable surfaces to pinch the tube shut and to segregate the tube-enclosed portions of the tube from a waste portion of the tube projecting beyond the mold sections, a blow head insertable into the tube for blowing the tube-enclosed portion to its final article configuration, means for at least partially opening the mold sections to release the pinched tube portion while still supporting the blown article, an actuatable grasping means engagable with the waste portion of the tube and means for actuating the grasping means for movement relative to the supported article to sever the waste portion therefrom at the pinched area thereof.

15. In a method of making a plastic article, including the steps of extruding a tube through an orifice, engaging the tube exteriorly of the orifice to support the same, enclosing and expanding a portion of the tube in a sectional blow mold, the blow mold pinching the tube to substantially sever from the mold-enclosed portion thereof a waste portion of the tube projecting beyond the confines of the mold, the improvements comprising at least partially opening the blow mold while supporting the article by the engaged tube portion, grasping the waste portion only of the tube with an extraneous grasping element, moving the grasping element and the waste portion relative to the article to separate the waste portion from the article, and then releasing the engaged portion of the tube to release the article.

16. In a method of severing a waste portion from a blown article still enclosed in a partible blow mold, the waste portion still being joined to the article and projecting beyond the mold, the steps of only partially opening the blow mold while still supporting the article thereby, grasping the waste portion only, and moving the waste portion relative to the supported article.

17. In a method of severing a first waste portion from an article blown from a tube and still enclosed in a partible blow mold and having another waste portion fixedly supported by a tube-engaging element, said first waste portion being joined to the article by a pinched portion tightly engaged by the blow mold, the steps of parting the blow mold sufficiently to release the pinched portion, continuing to support the other waste portion and the article by the tube-engaging element, grasping the first waste portion only, and moving the first waste portion relative to the article sufficiently to rupture the pinched joining portion.

18. In a method as defined in claim 17, the further steps of fully parting the blow mold, releasing said other waste portion, and removing the article with said other waste portion intact.

References Cited in the file of this patent
UNITED STATES PATENTS 2,928,120     Leghorn et al. _____ Mar. 15, 1960

FOREIGN PATENTS 789,967     Great Britain _____ Jan. 29, 1958